US Patent Office
3,403,152
Patented Sept. 24, 1968

3,403,152
1-ARYL-4-IMINO-1,2,3,4-TETRAHYDRO-QUINAZOLINES
Herbert Morton Blatter, Springfield, N.J., assignor to Ciba Corporation, New York, N.Y., a corporation of Delaware
No Drawing. Continuation-in-part of application Ser. No. 509,613, Nov. 24, 1965. This application Mar. 20, 1967, Ser. No. 624,210
5 Claims. (Cl. 260—256.4)

ABSTRACT OF THE DISCLOSURE 1-aryl-4-imino-1,2,3,4-tetrahydro-quinazolines of the Formula I

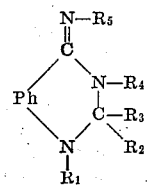

Ph=a 1,2-phenylene
$R_1$=aromatic radical
$R_2$=aliphatic or aromatic radical
$R_3$=H or aliphatic radical
$R_{4;5}$=H, aliphatic or aromatic radical N-oxides, quaternaries and salts thereof, e.g. the 4-n-propyl - imino - 1 - (4-fluoro-phenyl)-2-phenyl-1,2,3,4-tetrahydro-quinazoline, exhibit anti-inflammatory effects.

Cross-references to related applications

This is a continuation-in-part of application Ser. No. 509,613, filed Nov. 24, 1965 and now abandoned.

Summary of the invention

The present invention concerns and has for its object the provision of new 1-aryl-4-imino-1,2,3,4-tetrahydro-quinazolines, more particularly those of Formula I, in which Ph stands for a 1,2-phenylene radical, $R_1$ for an aromatic radical, $R_2$ for an aliphatic or aromatic radical, $R_3$ for hydrogen or an aliphatic radical, one of $R_4$ and $R_5$ for hydrogen, an aliphatic radical or aromatic radical and the other for hydrogen or an aliphatic radical, N-oxides, quaternaries and salts thereof, corresponding pharmaceutical compositions as well as methods for the preparation of the new compounds. Said compositions are primarily useful as anti-inflammatory agents, preferably for oral application in place of corticosteroids, in the treatment of tissue inflammations, such as arthritic and similar conditions, but also as diuretic agents for the relief of edema and the adjunctive management of hypertension.

Description of the preferred embodiments

The 1,2-phenylene radical Ph is unsubstituted or substituted by one or more than one of the same or different substituents attached to any of the positions available for substitution. Such substituents are, for example lower alkyl, such as methyl, ethyl, n- or i-propyl or -butyl, etherified hydroxy or mercapto, for example lower alkoxy or alkylmercapto, such as methoxy, ethoxy, n- or i-propoxy or n-butoxy, methyl- or ethyl- mercapto, esterified hydroxy, for example halogeno, such as fluoro, chloro or bromo, trifluoromethyl, nitro, amino, for example di-lower alkylamino, such as dimethylamino or diethylamino. Preferred 1,2-phenylene radicals Ph are 1,2-phenylene, (lower alkyl)-1,2-phenylene, (lower alkoxy)-1,2-phenylene, (lower alkyl-mercapto)-1,2-phenylene, (halogeno)-1,2-phenylene, (trifluoro-methyl)-1,2-phenylene, (nitro)-1,2-phenylene and (di-lower alkyl-amino)-1,2-phenylene.

An aromatic radical $R_1$, $R_2$, $R_4$ and /or $R_5$ particularly stands for mono- or bicyclic carbocyclic aryl, i.e. phenyl, 1- or 2-naphthyl, or monocyclic heterocyclic aryl, such as furyl, thienyl or pyridyl. Said aryl groups are unsubstituted or contain one or more than one of the same or different substituents attached to any position available for substitution, for example those mentioned for Ph. They stand primarily for phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl.

An aliphatic radical $R_2$, $R_3$, $R_4$ and/or $R_5$ represents especially lower alkyl, e.g. methyl, ethyl, n- or i-propyl, -butyl, -pentyl, -hexyl or -heptyl. It can also stand for lower alkenyl, such as allyl or methallyl, 3 to 8 ring-membered cyclo-alkyl or cycloalkyl-lower alkyl, especially such having five to seven ring-carbon atoms, such as cyclopropyl, cyclopentyl, cyclohexyl, cycloheptyl or cyclooctyl; cyclopropylmethyl, cyclopentylmethyl, 2-cyclopentylethyl, cyclohexylmethyl, 1-cyclohexylethyl or cycloheptylmethyl, as well as monocyclic carbocyclic aryl-lower alkyl, such as benzyl, 1- or 2-phenylethyl. These radicals may contain additional substituents, especially in the aromatic portion, such as those mentioned for Ph, as well as oxo or thiono in the aliphatic portion. They also may be interrupted by hetero atoms, preferably by one oxygen, sulfur and/or nitrogen atom. Such radicals are, for example lower alkoxy-lower alkyl, such as methoxymethyl, ethoxymethyl, n-propoxymethyl, 1- or 2-methoxy-, ethoxy or i-propoxyethyl, 1-, 2- or 3-methoxy-, ethoxy- or n- propoxy-propyl or 4-tert. butoxy-butyl, the corresponding phenoxylower alkyl and lower alkylmercapto-lower alkyl groups, mono- or di-lower alkylamino-lower alkyl, lower alkyleneimino-n-propoxymethyl, 1- or 2-methoxy-, ethoxy or i-propoxy-lower alkyl, aza, oxa- or thia-alkyleneimino-lower alkyl or N-lower alkyl- or phenyl-aza-alkyleneimino-lower alkyl groups with 4 to 6 ring-carbon atoms and in which radicals the heteroatoms are separated by at least two carbon atoms, such as 2-methylamino-, 2-dimethylamino- or 2-diethylamino ethyl, 3-dimethylamino- or 3-diethylamino-propyl, 2-pyrrolidino-ethyl, 3-piperidino-propyl, 2-piperazino-ethyl, 2 - (4 - methyl-piperazino)-ethyl, 3 - (4 - ethyl-piperazino)-propyl, 2-(4-phenyl-piperazino)-ethyl, 2-morpholino-ethyl or 3-thiamorpholino-propyl.

The quaternaries are particularly those containing additional lower alkyl or aralkyl groups, such as those mentioned above, quaternizing at least one tertiary nitrogen atom present.

The compounds of this invention have useful pharmacological properties. Apart from some diuretic effects, they exhibit primarily anti-inflammatory activity, as can be demonstrated in animal tests using mammals, for example, rats as test objects. Besides their above-mentioned utility, the compounds of the invention are also valuable intermediates in the preparation of other useful products, particularly of pharmacologically active compounds. Thus, the corresponding 1-aryl-4-imino-1,4-dihydro-quinazolines, disclosed in copending application Ser. No. 488,264, filed Sept. 17, 1965, are obtained from the compounds of this invention by dehydrogenation.

Particularly useful are compounds of the Formula I in which Ph stands for 1,2-phenylene, (lower alkyl)-1,2-phenylene, (lower alkoxy)-1,2-phenylene or (halogeno)-1,2-phenylene, each of $R_1$ and $R_2$ for phenyl, (lower alkyl)-phenyl, (lower alkoxy)-phenyl or (halogeno)-phenyl, $R_2$ also for lower alkyl, $R_3$ for hydrogen or lower alkyl and one of $R_4$ and $R_5$ for hydrogen and the other for lower alkyl, 3 to 8 ring-membered cycloalkyl, lower alkoxy-lower alkyl, mono- or di-lower alkylamino-lower alkyl, alkyleneimino-lower alkyl in which alkylene has from four to six carbon atoms, or aza- or thiaalkylene imino-lower alkyl in which the ring has from four to six carbon atoms and in which radicals the heteroatoms are separated from each other by at least two carbon atoms, and acid addition salts thereof.

Especially mentioned are those compounds of the Formula I in which Ph stands for 1,2-phnylene, $R_1$ for phenyl, 4-methoxy-phenyl, 4-fluoro-phenyl and 4-chloro-phenyl, $R_2$ for phenyl, each of $R_3$ and $R_4$ for hydrogen and $R_5$ for lower alkyl, and therapeutically acceptable acid addition salts thereof.

The compounds of Formula I, in which Ph stands for 1,2-phenylene, $R_1$ for 4-fluoro-phenyl, $R_2$ for phenyl, each of $R_3$ and $R_4$ for hydrogen and $R_5$ for hydrogen, methyl, ethyl, n- or i-propyl, n-, i- or sec. butyl which, when given orally to rats at doses between about 3 and 25 mg./kg./day, preferably between about 5 and 15 mg./kg./day, show outstanding anti-inflammatory effects according to the granulama pouch or carrageenin paw test.

The compounds of this invention are prepared according to known methods. For example, the process for their preparation consists in (a) reducing a 1-aryl-4-amino-1,4-dihydro-quinazoline, more particularly a compound of the Formula II

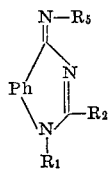

(II)

or (b) condensing a 2-arylamino-benzamidine with an aldehyde or ketone, more particularly compounds of the Formulae III and IV

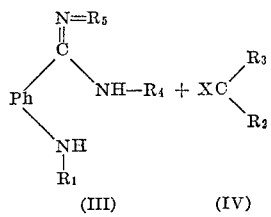

(III)    (IV)

in which X stands for oxygen or sulfur, or acetals or ketals of IV, or (c) reacting a 1-aryl-4-alkoxy- or alkylmercapto-1,2-dihydroquinazoline with ammonia or a primary amine, more particularly compounds of the Formulae V and VI

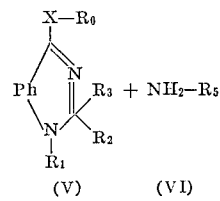

(V)    (VI)

in which $R_6$ stands for lower alkyl and, if desired, converting any compound obtained into another disclosed compound.

In the reduction according to (a) either catalytically activated or nascent hydrogen alone, for example hydrogen in the presence of nickel, platinum or palladium catalysts, or electrolytically generated hydrogen, or reducing agents may be used, for example complex light metal hydrides, such as alkali metal aluminum or borohydrides, e.g. lithium aluminum hydride or sodium borohydride.

In the condensation according to (b) any water formed may either be distilled off aceotropically or absorbed by a condensing agent, such as a carbodiimid.

The compounds obtained according to said process may be converted into other disclosed compounds by methods in themselves known. Thus, for example, into any primary, secondary or tertiary amino nitrogen atom, for example into compounds in wihch $R_4$ and/or $R_5$ stands for hydrogen, a substituent may be introduced, if necessary after conversion of the compound obtained into a metal, e.g. alkali metal, derivative thereof. This can be done, for example, by reaction with a reactive ester of an appropriate alcohol, for example, that of a hydrohalic, e.g. hydrochloric, hydrobromic or hydriodic acid, or a sulfonic acid, such as a lower alkane or benzene sulfonic acid, e.g. methane, ethane or p-toluene sulfonic acid, or an aryl diazonium salt, whereby higher substituted amines or quarternaries are obtained, or by reductive alkylation, i.e. reaction with an appropriate oxo compound and subsequent reduction, or by oxidation, for example with hydrogen peroxide, a percarboxylic or sulfonic acid, e.g. peracetic, perbenzoic, monoperphthalic or p-toluene per-sulfonic acid, in order to obtain the N-oxides. In compounds, amino-substituted by radicals which can be eliminated, for example, amino-substituted by α-arylalkyl, e.g. benzyl, or phthaloyl radicals, the said radicals can be split off in the usual manner by hydrogenolysis or hydrazinolysis.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents are especially used in the reaction with said reactive esters of an alcohol in order to eliminate the acid formed. They are basic agents, for example, alkali or alkaline earth metal carbonates or lower alkoxides, or more especially, organic bases such as pyridine or collidine, but particularly aliphatic tertiary amines, such as a tri-lower alkylamine, e.g. triethylamine.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic, or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the reactions of the invention that lead to the formation of those compounds indicated above as being specially valuable.

The starting material used in reaction (a) (which is the preferred method for the preparation of the new compounds) is disclosed in the above-mentioned co-pending application Ser. No. 488,264; it is preferably used in the form of the free base. The benzamidines used in reaction (b) can be obtained from corresponding benzo-nitriles by reaction with ammonia, amines or metal amides, e.g. aminomagnesium halides or sodium amides, or by condensation of corresponding anthranilic acid amides with amines, preferably in the presence of phosphorus trichloride or oxychloride. The 1,2-dihydro-quinazolines used as starting material in reaction (c) may be prepared analogous to the reaction (b) using instead of the amidines corresponding imido esters, or by reduction of corresponding quaternary 1-aryl-4-alkoxy- or alkylmercapto-quinazolinium salts also disclosed in the above-mentioned co-pending application.

The compounds of this invention are useful in the form of compositions for enteral, parenteral or topical administration, which contain a pharmacologically effective amount of the compounds of this invention in admixture with a pharmaceutically acceptable, organic or inorganic solid or liquid carrier, which usually represents the major portion of the pharmaceutical composition. For making up the latter, there are employed carrier materials suitable for the preparation of pharmaceutical compositions, such as water, gelatine, sugars, e.g. lactose, glucose or sucrose, starches, e.g. corn starch, wheat starch or rise starch, stearic acid or salts thereof, e.g. calcium or magnesium stearate, talc, vegetable oils, alcohol, e.g. ethanol, benzyl alcohol or cetyl alcohol, petrolatum, gums, acacia, propylene glycol, polyalkylene glycols or any other known carrier for pharmaceutical compositions. The pharmaceutical preparations may be in solid form, e.g. capsules, tablets or dragees, in liquid form, e.g. solutions or suspensions, or in the form of emulsions, e.g. salves or creams. If desired, they may contain auxiliary substances, such as preserving, stabilizing, wetting emulsifying, or coloring agents, salts for varying the osmotic pressure or buffers. The above preparations are prepared according to standard methods used for the manufacture of pharmaceutically acceptable compositions which contain about 0.1 to 75%, more particularly 1 to 50% of the active ingredient. They may also contain, in combination, other pharmacologically useful substances.

The following examples are intended to illustrate the invention and are not to be construed as being limitations thereon. Temperatures are given in degrees centigrade and all parts wherever given are parts by weight.

Example 1

To the pre-reduced suspension of 0.1 g. platinum oxide in 5 ml. absolute ethanol, the solution of 0.329 g. 1-(4-fluoro - phenyl) - 2 - phenyl - 4 - methylimino - 1,4 - dihydro-quinazoline in 25 ml. absolute ethanol is added and the mixture is hydrogenated under atmospheric pressure and temperature until 25.1 ml. hydrogen have been absorbed. The mixture is filtered, the filtrate evaporated under reduced pressure and the residue dissolved in 5 ml. dimethylformamide. Through the solution methylamine is bubbled through for 3 minutes, excess water is added, the precipitate formed filtered off and recrystallized from diethyl ether to yield the 1-(4-fluoro-phenyl)- 2 - phenyl - 4 - methylimino - 1,2,3,4 - tetrahydro - quinazoline of the formula

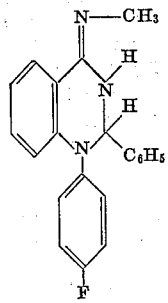

in fine, white needles melting at 170–171.5°.

Example 2

To the pre-reduced suspension of 0.1 g. platinum oxide in 10 ml. anhydrous ethanol, the solution of 1 g. 1-(4-fluoro - phenyl) - 2 - phenyl - 4 - n - propylimino - 1,4-dihydro-quinazoline in 170 ml. anhydrous ethanol is added and the mixture is hydrogenated under atmospheric pressure and temperature until 90.2 ml. hydrogen have been absorbed. It is then filtered, evaporated in vacuo and the residue recrystallized from diethyl ether to yield the 1 - (4 - fluoro - phenyl) - 2 - phenyl - 4 - n - propylimino - 1,2,3,4 tetrahydro - quinazoline of the formula

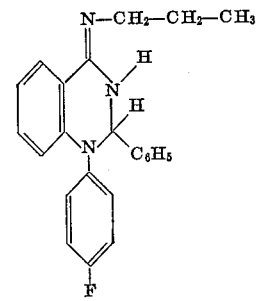

melting at 171 to 173°.

Example 3

In the manner described in Example 2, the following compounds are prepared from equivalent amounts of the corresponding starting material, having the formulae

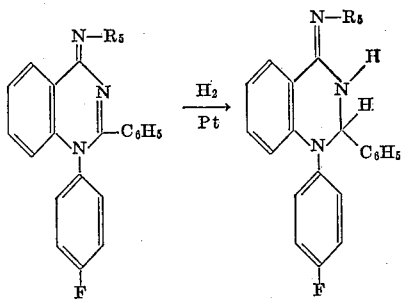

| $R_5$ | M.P. of VII (deg.) | Recrystallized from— |
|---|---|---|
| $C_2H_5$ | 147–148 | Diethyl ether. |
| $i\text{-}C_3H_7$ | 104–105 | Acetone-hexane. |
| $n\text{-}C_4H_9$ | 134–135 | Diethyl ether-pentane. |
| $i\text{-}C_4H_9$ | 137–138 | Hexane. |
| sec. $C_4H_9$ | 78–84 | Aqueous methanol. |
| H | 170–175 | Diethyl ether. |
| —⟨phenyl⟩—F | 87–90 | Diethyl ether-pentane. |

A representative example for the preparation of the starting material is the following:

To the mixture of 33.3 g. 4-fluoro-aniline and 100 ml. pyridine, 42.1 g. benzoylchloride are added slowly while cooling and stirring. Hereupon the reaction mixture is poured into 600 ml. water, the precipitate formed filtered off, washed with water and recrystallized from ethanol to yield the N-(4-fluoro-phenyl)-benzamide melting, after recrystallization from ethanol, at 183–187°.

The mixture of 46.0 g. thereof and 100 ml. thionychloride is refluxed for 3 hours and then evaporated. The residue is distilled and the fraction boiling at 180°/20 mm. Hg collected. It represents the N-(4-fluoro-phenyl)-benzimidchloride.

The solution of 4.66 g. thereof in 25 ml. diethyl ether is added rapidly to the mixture prepared from the solution of 1.35 g. sodium methoxide in 50 ml. anhydrous ethanol to which 4.56 g. methyl salicylate have been added rapidly while stirring. The mixture is allowed to stand at room temperature for 30 minutes and is evaporated in vacuo. The residue is triturated with water, filtered off and recrystallized from ethanol to yield the 2-carbomethoxy - phenyl N - (4 - fluoro-phenyl)-benzimidoate melting at 126–130°.

85.0 g. thereof are heated to 275° for 10 minutes. After cooling the residue is triturated with diethyl ether, filtered off and recrystallized from methanol to yield the methyl N-benzoyl-N-(4-fluoro-phenyl)-anthranilate melting at 110–116°.

To the solution of 34.9 g. thereof in 200 ml. ethanol and 110 ml. water the mixture of 5.4 g. sodium methoxide, 100 ml. ethanol and 20 ml. water is added. The mixture is refluxed for 1½ hours, concentrated and the aqueous solution acidified with concentrated hydrochloric acid. It is extracted with methylene chloride, the extract evaporated, the residue taken up in aqueous sodium bicarbonate, the solution acidified with hydrochloric acid, the precipitate formed filtered off, dissolved in methylene chloride, the solution dried and diluted with hexane. The precipitate formed is filtered off and recrystallized from diethyl ether to yield the N-benzoyl-N-(4-fluoro-phenyl)-anthranilic acid melting at 176 to 178°.

The mixture of 20.0 g. thereof and 100 ml. phosphorus oxychloride is refluxed for 19 hours and then evaporated. The residue is taken up in about 200 ml. methylene chloride and the solution of the resulting acid chloride treated for 1 hour with ammonia until it becomes basic. It is washed with water, dried, concentrated, the concentrate diluted with hexane, the precipitate formed, filtered off, and recrystallized from acetone-hexane to yield the 1-(4-fluoro-phenyl)-2-phenyl-3,4-dihydro-4-quinazolone melting at 289–290°.

The mixture of 10.5 g. thereof, 8.9 g. phosphorus pentasulfide and 150 ml. xylene is refluxed to 2 hours while stirring. After cooling 60 ml. of 10% aqueous sodium hydroxide are added, the precipitate formed filtered off, washed with hot ethanol and recrystallized with acetone, while using charcoal for decolorization, to yield the 1-(4-fluoro-phenyl)-2-phenyl-1,4-dihydroquinazolin - 4 - thione melting at 293–296°.

The mixture of 8.75 g. thereof and 15 ml. methyliodide is refluxed for 1½ hours. The solid is filtered off and recrystallized from acetone to yield the 1-(4-fluoro-phenyl)-2-phenyl-4-methylmercapto-quinazolinium iodide melting at 270–290° with decomposition.

To the solution of 2.0 g. thereof in 20 ml. dimethylformamide, 0.75 g. n-propylamine are added dropwise while stirring. After standing for 15 minutes at room temperature, water is added, the precipitate formed filtered off and recrystallized from acetone to yield the desired 1-(4-fluoro-phenyl)-2-phenyl-4-n-propylimino - 1,4 - dihydro-quinazoline melting at 234 to 235°.

Example 4

In the manner shown in the previous examples, the following compounds are prepared by using the equivalent amounts of the corresponding starting materials:

4-(2-methyl-propylimino)-1-(4-fluoro-phenyl)-2-phenyl-1,2,3,4-tetrahydro-quinazoline,
4-n-pentylimino-1-(4-fluoro-phenyl)-2-phenyl-1,2,3,4-tetrahydro-quinazoline,
4-(4-fluorophenylimino)-1-(4-fluoro-phenyl)-2-phenyl-1,2,3,4-tetrahydro-quinazoline,
4-(4-fluorophenylimino)-1-(4-fluoro-phenyl)-2-phenyl-1,2,3,4-tetrahydro-quinazoline,
4-cyclopropylimino-1-(4-fluoro-phenyl)-2-phenyl-1,2,3,4-tetrahydro-quinazoline,
4-cyclopropylmethylimino-1-(4-fluoro-phenyl)-2-phenyl-1,2,3,4-tetrahydro-quinazoline,
4-(2-butylimino)-1,2,-diphenyl-1,2,3,4-tetrahydro-quinazoline,
4-cyclopropylimino-1,2,-diphenyl-1,2,3,4-tetrahydro-quinazoline,
4-(4-fluorobenzylimino)-1,2-diphenyl-1,2,3,4-tetrahydro-quinazoline,
4-(2-butylimino)-1-(4-chloro-phenyl)-2-phenyl-1,2,3,4-tetrahydro-quinazoline,
4-(2-methyl-propyl)-1-(4-chloro-phenyl)-2-phenyl-1,2,3,4-tetrahydro-quinazoline,
4-(2-ethylamino-ethylimino)-1-phenyl-2-methyl-1,2,3,4-tetrahydro-quinazoline,
4-(2-pyrrolidino-ethylimino)-1-(4-methyl-phenyl)-2-ethyl-1,2,3,4-tetrahydro-quinazoline,
4-(2-piperazino-ethylimino)-1-(3-trifluoromethyl-phenyl)-2-benzyl-1,2,3,4-tetrahydro-quinazoline,
4-(2-morpholino-ethylimino)-1,2-diphenyl-6-methoxy-1,2,3,4-tetrahydro-quinazoline,
4-(2-thiamorpholino-ethylimino)-1,2-diphenyl-6-methyl-1,2,3,4-tetrahydro-quinazoline,
4-cyclopentyl-imino-6-chloro-1,2-diphenyl-1,2,3,4-tetrahydro-quinazoline,
4-(2-ethoxy-ethylimino)-1-(3,4-dichloro-phenyl)-2-(4-methyl-phenyl)-1,2,3,4-tetrahydro-quinazoline,
4-(3-methylmercapto-propylimino)-1-(4-bromo-phenyl)-2-isopropyl-1,2,3,4-tetrahydro-quinazoline,
4-(2-phenoxy-ethylimino)-1-phenyl-2-(3-nitro-phenyl)-1,2,3,4-tetrahydro-quinazoline,
4-cyclopropylmethylimino-1-phenyl-2-(4-bromophenyl)-1,2,3,4-tetrahydro-quinazoline,
4-benzylimino-1-phenyl-2-(4-methyl-phenyl)-1,2,3,4-tetrahydro-quinazoline,
4-(2-cyclopentyl-ethylimino)-1-(2-naphthyl)-2-(4-methoxy-phenyl)-1,2,3,4-tetrahydro-quinazoline,
4-n-hexylimino-1-phenyl-2-(4-methylmercapto-phenyl)-1,2,3,4-tetrahydro-quinazoline,
4-imino-1-(4-chloro-phenyl)-2-phenyl-1,2,3,4-tetrahydro-quinazoline.

Example 5

Preparation of 10,000 tablets, each containing 10 mg. of the drug substance—

Formula:                                                        Grams
4 - n - propylimino - 1-(4-fluoro-phenyl)-2-
  phenyl-1,2,3,4-tetrahydro-quinazoline ___    100.00
Lactose _____ 1,157.00
Talcum powder _____    75.00
Magnesium stearate _____    18.00
Corn starch, anhydrous _____    75.00
Polyethylene glycol 6000 m.w. _____    75.00
Purified water _____      q.s.

Procedure

The drug substance, lactose, talcum, magnesium stearate and half of the starch are passed through a screen with 1 mm. openings and mixed thoroughly. The remaining 37.5 g. of the starch are suspended in 37.5 ml. water, 112.5 ml. boiling water are added while stirring, followed by the mixture of the polyethylene glycol and 37.5 ml. water. With the resulting paste the mixed powder is granulated, using more water if required. The granulate is dried overnight at 35–40°, broken through a screen with 4 mm. openings and compressed into tablets using 6.4 mm. concave punches, uppers bisected.

In the above formula the drug substance can be replaced by the same amount of 4-ethylimino-, 4-i-propylimino- or 4 - n - butylimino-1-(4-fluoro-phenyl)-2-phenyl-1,2,3,4-tetrahydro-quinazoline.

I claim:

1. A member selected from the group consisting of the compound having the formula

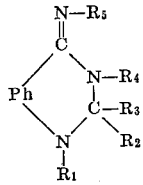

in which Ph is a member selected from the group consisting of 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene, and (di-lower alkylamino)-1,2-phenylene, $R_1$ is a member selected from the group consisting of phenyl, (lower alkyl)-phenyl, (lower alkoxy) - phenyl, (lower alkylmercapto) - phenyl, (halogeno)-phenyl, (trifluoromethyl)-phenyl, (nitro)-phenyl and (di-lower alkylamino)-phenyl, $R_2$ is a member selected from the group consisting of $R_1$, lower alkyl, lower alkenyl, 3 to 8 ring-membered cycloalkyl and cycloalkyl-lower alkyl, phenyl-lower alkyl, lower alkoxy-lower alkyl, lower alkylmercapto-lower alkyl, phenoxy-lower alkyl, lower alkylamino-lower alkyl, di-lower alkylamino-lower alkyl, lower alkyleneimino-lower alkyl, 6 to 8 ring-membered azaalkyleneimino-lower alkyl, oxaalkyleneimino-lower alkyl and thiaalkyleneimino-lower alkyl in which the heteroatoms are separated by at least two carbon atoms, $R_3$ is a member selected from the group consisting of hydrogen and lower alkyl, one of $R_4$ and $R_5$ is a member selected from the group consisting of hydrogen and $R_2$, and the other is a member selected from the group consisting of hydrogen, lower alkyl, lower alkenyl, 3 to 8 ring-membered cycloalkyl and cycloalkyl-lower alkyl, phenyl-lower alkyl, lower alkoxy-lower alkyl, lower alkylmercapto-lower alkyl, phenoxy-lower alkyl, lower alkylamino-lower alkyl, di-lower alkylamino-lower alkyl, lower alkyleneimino-lower alkyl, 6 to 8 ring-membered azaalkyleneimino-lower alkyl, oxaalkyleneimino-lower alkyl and thiaalkyleneimino-lower alkyl in which the heteroatoms are separated by at least two carbon atoms, the N-oxides, therapeutically acceptable lower alkyl and phenyl-lower alkyl quaternaries, and therapeutically acceptable acid addition salts thereof.

2. A compound as claimed in claim 1 and having the formula

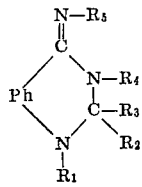

in which Ph is a member selected from the group consisting of 1,2-phenylene, (lower alkyl)-1,2-phenylene, (lower alkoxy)-1,2-phenylene and (halogeno)-1,2-phenylene, $R_1$ is a member selected from the group consisting of phenyl, (lower alkyl)-phenyl, (lower alkoxy)-phenyl and (halogeno)-phenyl, $R_2$ is a member selected from the group consisting of lower alkyl, phenyl, (lower alkyl)-phenyl, (lower alkoxy)-phenyl and (halogeno)-phenyl, $R_3$ is a member selected from the group consisting of hydrogen and lower alkyl one of $R_4$ and $R_5$ is a member selected from the group consisting of hydrogen and lower alkyl and the other is a member selected from the group consisting of hydrogen, lower alkyl, 3 to 8 ring-membered cycloalkyl, lower alkoxy-lower alkyl, lower alkylamino-lower alkyl, di-lower alkylamino-lower alkyl, 5 to 7 ring-membered alkyleneimino-lower alkyl, 6 to 8 ring-membered azaalkyleneimino-lower alkyl, oxaalkyleneimino-lower alkyl and thiaalkyleneimino-lower alkyl in which the heteroatoms are separated by at least two carbon atoms, and therapeutically acceptable acid addition salts thereof.

3. A compound as claimed in claim 1 and having the formula

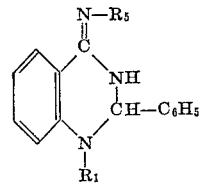

in which $R_1$ is a member selected from the group consisting of phenyl, 4-methoxy-phenyl, 4-fluoro-phenyl and 4-chloro-phenyl and $R_5$ is lower alkyl and therapeutically acceptable acid addition salts thereof.

4. A compound as claimed in claim 1 and having the formula

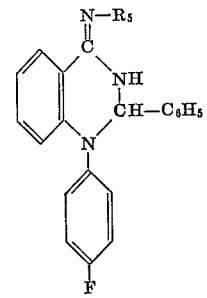

in which $R_5$ is a member selected from the group consisting of hydrogen, methyl, ethyl, n-propyl, i-propyl, n-butyl and sec. butyl and therapeutically acceptable acid addition salts thereof.

5. A compound as claimed in claim 1 and being the 4-(4 - fluoro - phenylimino) - 1-(4-fluoro-phenyl)-2-phenyl-1,2,3,4-tetrahydro-quinazoline.

References Cited

UNITED STATES PATENTS 3,340,260   9/1967   Blatter _____ 260—256.4

NICHOLAS S. RIZZO, *Primary Examiner.*

R. J. GALLAGHER, *Assistant Examiner.*